United States Patent [19]

Covington

[11] Patent Number: 4,974,788
[45] Date of Patent: Dec. 4, 1990

[54] FILM SPOOL WITH SEPARATE KEEPER

[75] Inventor: Roger G. Covington, Rochester, N.Y.

[73] Assignee: Eastman Kodak Company, Rochester, N.Y.

[21] Appl. No.: 441,848

[22] Filed: Nov. 27, 1989

[51] Int. Cl.[5] .......................................... B65H 75/28
[52] U.S. Cl. ................................................ 242/74.1
[58] Field of Search ....................... 242/74.1, 74, 74.2, 242/125.1, 125.2; 254/DIG. 14

[56] References Cited

U.S. PATENT DOCUMENTS

| | | |
|---|---|---|
| 2,940,232 | 6/1960 | Wallace et al. . |
| 3,506,212 | 4/1970 | Wenskus . |
| 3,921,927 | 11/1975 | Esashi et al. . |
| 4,290,562 | 9/1981 | Sasaki et al. . |
| 4,341,358 | 7/1982 | Shoji . |
| 4,786,007 | 11/1988 | Schoettle . |
| 4,809,923 | 3/1989 | Adriaensen et al. . |
| 4,852,821 | 8/1989 | Harris et al. . |

FOREIGN PATENT DOCUMENTS 820371  7/1949  Fed. Rep. of Germany ..... 242/74.2

Primary Examiner—John M. Jillions
Assistant Examiner—John P. Darling
Attorney, Agent, or Firm—Charles E. Snee, III

[57] ABSTRACT

A spool for a strip of film or other web material has a core and an elongate slot through the core for receiving an end portion of the strip. A separate keeper for retaining the end portion in the slot includes a first portion that is snapped into the slot and holds the end portion firmly against one surface of the slot. The keeper has a second portion that is engageable with the strip outside the slot for holding the strip against an arcuate portion of the core. The keeper can be latched in either a first position in which the keeper is partially inserted into the slot during insertion of the end portion into the slot, or a second position in which the keeper is fully inserted into the slot.

13 Claims, 4 Drawing Sheets

FILM SPOOL WITH SEPARATE KEEPER

TECHNICAL FIELD

This invention relates to a spool on which strip of photographic film or other web material can be wound. More particularly, the invention relates to a spool having a slot for receiving a separate keeper with the keeper being effective to firmly attach the strip to the spool core and also hold a portion of the strip against an arcuate portion of the outer surface of the core.

BACKGROUND ART

Various techniques are known for attaching the end of a strip of film or other web material to a spool. For example, a film end can be attached to a spool by a piece of adhesive tape. Also, it is known to provide a slot in a spool with one or more teeth or hooks in the slot for engaging openings in an end portion of the film to attach the end portion to the spool. It is also known to use a pin or other kinds of locking members for holding an end portion of film in a spool slot.

When the film has been attached to the spool, the spool is rotated to wind a predetermined length of the film onto the spool. Then the spool can be loaded into a cassette. Film can be removed from the spool by pulling the end of the film opposite from its attachment to the spool away from the spool, as in conventional 35 mm film cassettes. However, in some instances it is desirable to have all of the film wound into the cassette and then to drive the film out of the cassette by rotating the film spool within the cassette in an unwinding direction. In order to thrust the film out of the cassette in this manner, a force must be exerted on the film in its lengthwise direction. If the film is attached by conventional methods, such as adhesive tape or by inserting the film into a slot and engaging it with hooks in the slot, there may not be sufficient rigidity or beam strength in the film to effect thrusting of the free end of the film out of the cassette. The spool of the present invention overcomes this problem and provides a unique and improved manner for attaching the film to the spool.

SUMMARY OF THE INVENTION

It is an object of the invention to attach an end portion of a strip of film or other web material to a spool in a way which enhances thrusting of the film strip or web material from a cassette. Another object of the invention is to securely attach a film strip to a spool in a way which locks the film strip to the spool to prevent inadvertent withdrawal of the strip from the spool.

The invention relates to a spool for a strip of film or other web material having an end portion that is to be attached to the spool before winding the film onto the spool. The spool has an elongate core, the core being rotatable about an axis through the core for winding film onto its outer surface and for unwinding film from the surface. The core has first and second spaced inner surfaces defining a slot for receiving an end portion of the film. A film keeper retains the film end portion in the slot. The keeper has a first portion shaped to enter the slot and hold the film end portion firmly against a first surface of the slot, and the keeper has a second portion engageable with the film outside the slot for holding the film against an arcuate portion of the outer surface of the core.

BRIEF DESCRIPTION OF THE DRAWINGS

In the detailed description of the preferred embodiment of the invention presented below, reference is made to the accompanying drawings in which.

DETAILED DESCRIPTION OF THE INVENTION

In the following description the invention will be discussed with respect to its use with photographic film, such as 35 mm film. However, is will be understood that the invention is also usable with other kinds of film and web materials.

Figure 1:
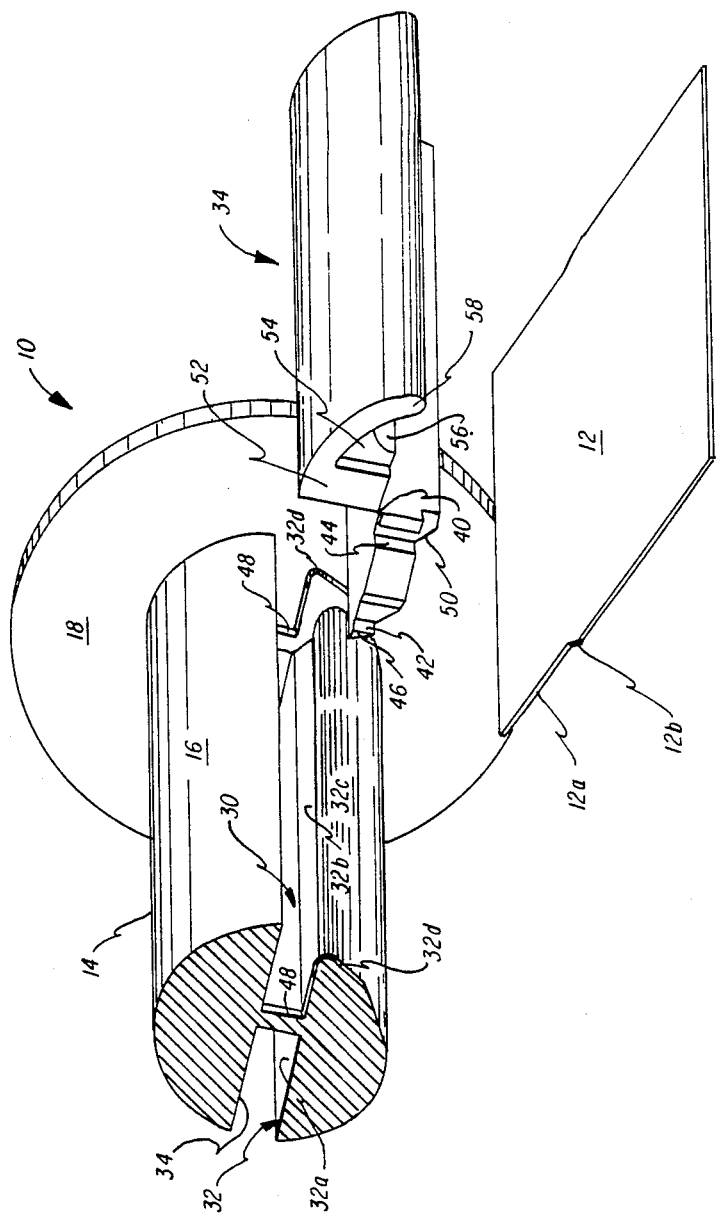
FIG. 1 is an exploded perspective view, partially in section, showing a spool of the present invention and an end portion of a strip of film that is to be attached to the spool.

Referring now to the drawings in detail, a spool of the invention is generally designated 10 and is adapted to have a strip of film 12 or other web material wound onto the spool and unwound from the spool. As shown in FIG. 1, the film strip 12 can have an end portion 12a that is narrower than the other portions of the film strip. It is the narrowed end portion that is attached to the spool as explained in more detail later. There is a shoulder 12b at each side of the film between end portion 12a and the full-width portion of the film strip.

Figure 2:
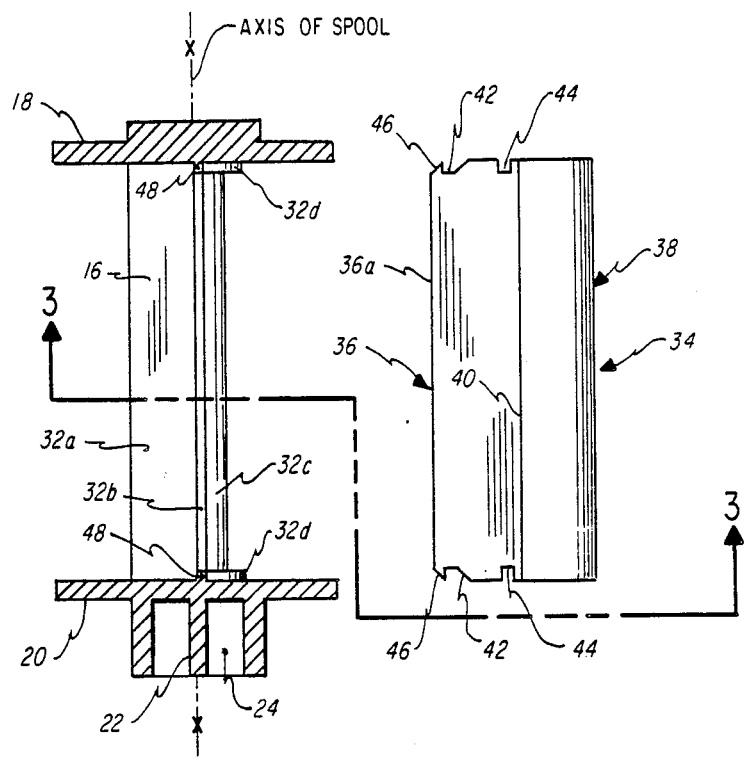
FIG. 2 is an exploded view taken along line 2—2 of FIG. 3.

The spool has an elongated core 14 having a generally cylindrical outer surface 16 on which the film strip 12 is wound. A pair of end flanges 18 and 20 at opposite ends of the core 14 are spaced apart by a distance substantially equal to the full-width portion of the film strip 12. As shown in FIG. 2, a keying rib 22 can be provided in an opening 24 at one end of the spool, and a similar keying arrangement can be provided at the other end (not shown) if desired. Rib 22 can be engaged for rotating the spool about its axis x—x for winding film onto the spool or for driving the spool in an unwinding direction.

Figure 3:
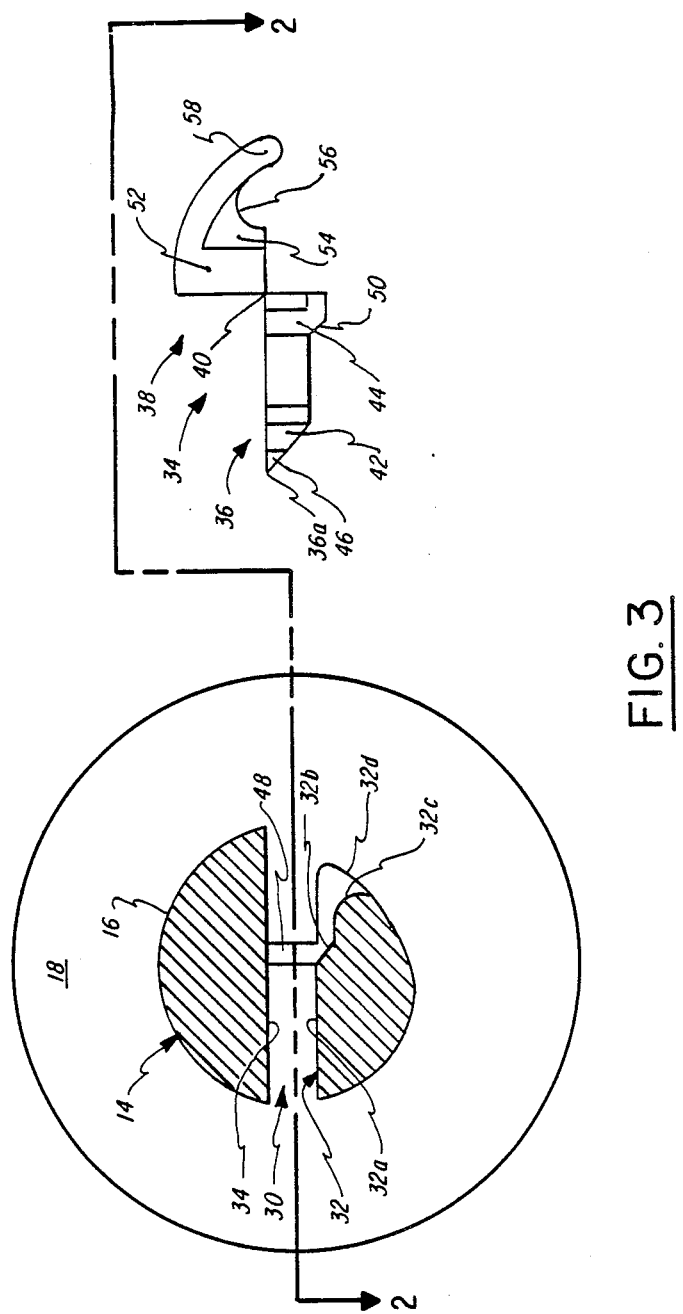
FIG. 3 is a cross-sectional view taken along line 3—3 of FIG. 2.

An elongate slot 30 extends diametrally entirely through the core 14 of the spool, and it extends in an axial direction a distance at least of equal to the width of the narrow end portion 12a of the film strip. Preferably the axis x—x of the spool extends through the slot. More specifically, the slot is defined by first and second spaced and generally parallel inner surfaces 32, 34. Surface 34 is substantially flat throughout its length and width. However, surface 32 is flat and parallel to surface 34 only over about half of its diametral dimension. This flat portion is designated 32a in the drawings. Surface 32 also has a step 32b that slopes downwardly and outwardly away from surface 32a along substantially the entire length of the surface 32. The step 32b merges into a round, generally semi-cylindrical nose-shaped portion 32c which extends from the lower edge of the step 32b to the outer surface 16 of the core 14. Surface 32 also includes shoulder portions 32d having an upper edge coplanar with surface portion 32a and a radially outer edge portion that merges smoothly into the outer surface 16 of the core as shown in FIG. 3, for example.

Figure 4:
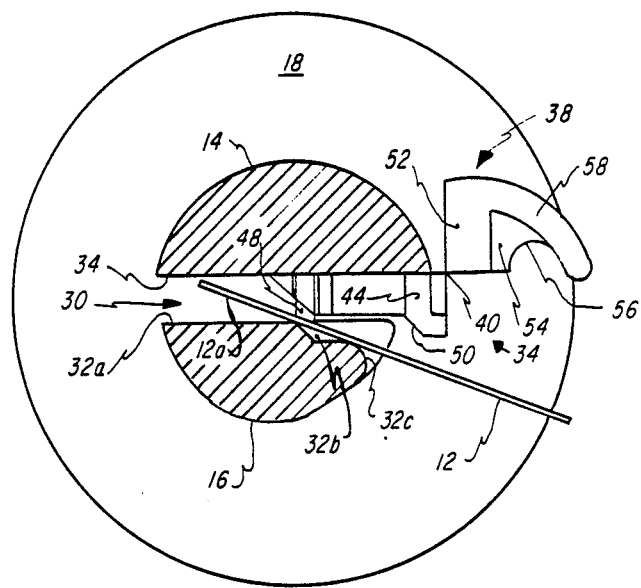
FIG. 4 is a cross-section view similar to FIG. 3, but showing the keeper latched in a first position relative to the core to enable insertion of the film end portion into the core slot.

The spool is provided with a film keeper, generally designated 34, that retains the film end portion 12a in the slot 30 and holds part of the film strip against surface 16 of the spool core. More specifically, keeper 34 has a first portion 36 that is shaped to enter the slot and hold the film end portion firmly against surface 32 of the slot. The keeper also has a second portion 38 that is engageable with the film 12 just outside the slot 30 and holds a portion of the film against the outer surface 16 of the spool core. An elongate continuous hinge 40 connects keeper portions 36, 38 and enables keeper portion 38 to be moved between the positions shown in FIGS. 4 and 5. Preferably the keeper is made of a resilient or flexible moldable material, such as polypropylene. Such a material enables the entire keeper to be molded in one piece and with the hinge 40 comprising a "living" hinge that is integral with both portions 36 and 38 of the keeper. Such a material also enables some deflection of portions of the keeper during insertion of the keeper into the slot, as explained later. By molding the keeper in the shape shown in FIGS. 1-3, the portion 38 of the keeper is spaced from slot 30 during insertion of the film into the slot as shown in FIG. 4. Keeper portions 36 and 38 will now be described in detail.

Figure 5:
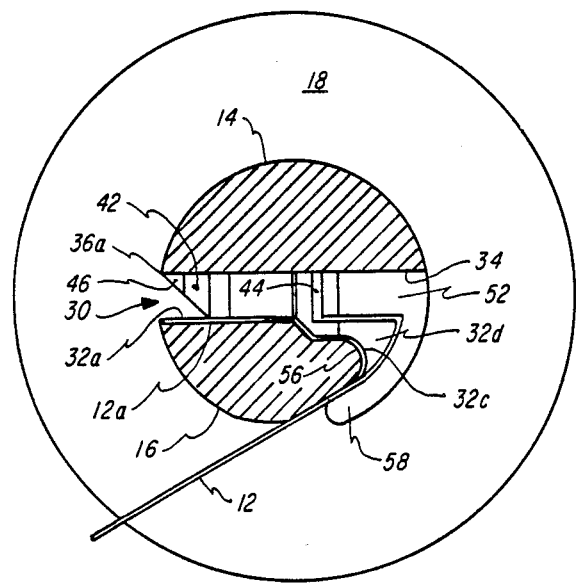
FIG. 5 is a view similar to FIG. 4, but showing the keeper in a second position fully inserted into the slot of the core for attaching the film end portion to the spool.

Keeper portion 36 is generally rectangular in shape, as best shown in FIG. 2, and has a leading edge portion 36a that enters a slot 30 first. Portion 36a is tapered from its upper surface toward its lower surface, as shown in FIGS. 3-5, so that it will not interfere with insertion of end portion 12a of the film in the slot 30 as explained later. This shape of edge portion 36a also facilitates initial insertion of the keeper into the slot.

Keeper portion 36 has two pair of recesses 42, 44 along the side edges thereof with the recesses 42 being nearer to the leading edge 36a than the recesses 44. Keeper portion 36 also has tapered surfaces 46 that extend outwardly and rearwardly from the leading edge of the keeper portion 36 to a point just ahead of the recesses 42. Similarly, the edge of the recesses 42 taper outwardly and rearwardly away from the leading edge of keeper portion 36. Recesses 42, 44 cooperate with catches 48 on the spool core 14. Catches 48 extend between surfaces 32, 34 of the slot 30 and are located at the opposite ends of the slot. Recesses 42, 44 and the catches 48 comprise cooperating latch means that are used for retaining the keeper in either of two positions relative to the core as explained in more detail later.

As best shown in FIGS. 3-5, the thickness of keeper portion 36 between recesses 44 and the leading edge portion 36a is substantially equal to the thickness between the surfaces 32a and 34 of slot 30. The portion comprising the recess 44 is somewhat thicker in shape and includes a downwardly sloped wall 50 that extends rearwardly away from the thinner portion. Wall 50 is parallel to step 32b and cooperates with step 32b to grip the film strip when the keeper is fully inserted into the slot 30.

Keeper portion 38 comprises a wall 52 that extends from the hinge 40. Keeper portion 38 has notches 54 in the ends thereof, one of which is illustrated in FIGS. 1 and 3-5. Notches 54 are shaped and located so that they receive the shoulder portions 32d on the spool core when the keeper is fully inserted into the slot in the spool.

Keeper portion 38 also has an elongate generally semi-cylindrical surface 56 that extends from one notch 54 to the other and which is shaped to conform to the nose portion 32c of the core slot 32. Keeper portion 38 also has a projecting finger 58 that extends the full length of this portion of the keeper and is shaped to conform to a portion of the core surface 16 adjacent to the point where the portion 32c merges into the outer surface 16 of the core.

When it is desired to attach the end portion 12a of the film strip to the spool 10, keeper 34 is positioned relative to slot 30 in the manner shown in FIG. 3. Then the keeper is moved to the left to bring the leading edge portion 36a into the slot until the pair of recesses 42 engage the catches 48 on the spool, as shown in FIG. 4. As this movement occurs, the tapered surfaces 46 will engage catches 48 to initially center the keeper relative to the slot 30, and the portions of the keeper adjacent the surfaces 46 will deflect to enable the catches to enter the recesses 42 in the keeper. The lower edge of keeper portion 36 between the recesses 42, 44 rests on the top edges of shoulder portions 32d of the slot to support the keeper in this initial position relative to the slot.

When the keeper is in the FIG. 4 position, the tapered leading edge portion 36a of the keeper leaves a space between the keeper and the surface 32 of the slot 30 so that the leading end portion 12a of the film strip 12 can be inserted between the keeper and surface 32 as shown in FIG. 4. The film strip is inserted until the shoulder 12b engages the catches 48 on the spool, at which time the free end of the film strip extends through the slot until it is substantially even with the left edge of surface 32a of the slot. At this time portion 38 of the keeper is away from slot 30 and does not interfere with insertion of the film into the slot.

Next the keeper portion 38 is swung about the hinge 40 until the upper surface of wall 52 is substantially parallel with the upper surface of keeper portion 36, and then the keeper is moved to the left from its FIG. 4 position to its FIG. 5 position. As this movement occurs recesses 42 on the keeper move past the catches 48 and the catches enter the pair of recesses 44 to lock the keeper in the FIG. 5 position against inadvertent removal from the spool.

As the keeper is moved to its FIG. 5 position the bottom surface of keeper portion 36 presses the end portion 12a of the film strip firmly against the surface 32a of the slot. Also, the downwardly sloped wall 50 of keeper portion 36 moves into closely spaced and parallel relationship with the step 32b of the slot 30 to urge the film strip against the step 32b. Similarly, the semi-cylindrical surface 56 of the keeper portion 38 urges a portion of the film strip 12 against the nose-shaped portion 32c of the slot. Thus the film strip is forced into a stepped configuration in which portions of the film strip bear against slot surfaces 32a, 32b and 32c to firmly hold the film against inadvertent withdrawal. This stepped configuration is very effective for preventing inadvertent withdrawal. Also, the finger portion 58 of the keeper engages and holds part of the film strip against the outer surface 16 of the spool core adjacent surface 32c so that the film strip extends in a tangential manner from the surface of the core. This tangential relationship of the film strip and core surface aids in thrusting film from the spool and out of an associated cassette (not shown) by increasing the beam strength of the film strip in its lengthwise direction.

As will be observed from FIG. 5, when the keeper is fully inserted into the slot and film is wound clockwise onto the core the first full convolution of film encounters a substantially smooth and continuous surface in the area where there is a transition from the spool outer surface 16 to the outer surface of the keeper portion 38, and again as the film extends over the transition from finger 58 back to the surface 16 of the core. This smooth transition from one area to another avoids undesirable pressure marks in the film that might result if the film encountered a sharp step as it is wrapped around the film core.

A number of advantages are achieved by the invention. First of all the keeper 34 can be molded as a single piece, and it is easily inserted into its preassembly position (FIG. 4) or its fully assembled position (FIG. 5). By providing for a preassembly position, the film end portion can be inserted into the slot of the spool core without concern that the keeper will be moved or displaced relative to the spool core in a way which would interfere with loading of the film into the slot. Final positioning of the keeper is simple and effective, and requires only that the keeper portion 38 be swung about the hinge 40 and moved into the slot 30 in the core. Moreover, the stepped configuration in which the end portion 12a of the film is held effectively locks it in place and avoids inadvertent removal of the film from the spool even when substantial forces are exerted on the film strip. Also, the full width of the film is held against the outer surface of the spool core by the finger 58 so that the film extends in a tangential manner from the core surface, thus increasing the beam strength of the film strip and enhancing the thrusting of the film when the spool is driven in an unwinding direction.

The invention has been described in detail with particular reference to a preferred embodiment thereof, but it will be understood that variations and modifications can be effected within the spirit and scope of the invention.

I claim:

1. In a spool for a strip of film or other web material having an end portion that is to be attached to the spool before winding the film onto the spool, the spool having an elogate core with an outer surface, the core being rotatable about an axis through the core for winding film onto the outer surface and unwinding film from the outer surface, and the core having first and second spaced surfaces defining a slot beginning at the outer surface, passing essentially diametrically through the core and ending at the outer surface, said slot being for receiving an end portion of the film, the improvement comprising:
    a film keeper for retaining the film end portion in said slot, said keeper having a first portion shaped to enter said slot radially through said outer surface of said core and hold the film end portion firmly against said first surface of said slot and a second portion pivotable relative to said first portion to engage the film outside said slot for holding the film against a curved portion of said outer surface of said core.

2. A spool as set forth in claim 1 wherein said first surface of said slot has a step extending in an axial direction along said core, and said first portion of said keeper has a correspondingly shaped portion for holding the film end portion against said step.

3. A spool as set forth in claim 1, further comprising cooperating latch means on said core and keeper for retaining said keeper in either (1) a first position relative to said core wherein said first portion of said keeper is partially inserted into said slot but spaced from said first surface of said slot by a distance sufficient to enable the film end portion to be inserted into said slot between said first portion of said keeper and said first surface of said slot or (2) a second position wherein said first portion of said keeper is fully inserted in said slot for holding the film end portion against said first surface of said slot and said second portion of said keeper holds the film against said outer surface of said core.

4. A spool as set forth in claim 3, wherein said first surface of said slot comprises a first flat portion, a step portion that slopes away from said flat portion, and a rounded portion that extends from the edge of said step portion opposite from said flat portion.

5. A spool as set forth in claim 4, further comprising a hinge connecting said first and second portions of said keeper so that said second portion of said keeper can be held away from said slot when said keeper is in said first position to facilicate insertion of the film end portion into said slot and then said second portion can be swung about said hinge as said keeper is moved from said first to said second position relative to said core.

6. A spool as set forth in claim 3, wherein said cooperating latch means comprises catches at opposite ends of said slot and two pair of recesses along side portions of said keeper with the first pair of recesses receiving said catches when said keeper is in said first position and the second pair of recesses receiving said catches when said keeper is in said second position.

7. A spool as set forth in claim 3 wherein said first surface of said slot has a step extending in an axial direction along said core, and said first portion of said keeper has a correspondingly shaped portion for holding the film end portion against said step.

8. A spool as set forth in claim 1, further comprising a hinge connecting said first and second portions of said keeper so that said second portion of said keeper can be held away from slot when said keeper is in said first position to facilitate insertion of the film end portion into said slot and then said second portion can be swung about said hinge as said keeper is moved from said first to said second position relative to said core.

9. In a spool for a strip of film or other web material having an end portion that is to be attached to the spool before winding the film onto the spool, the spool having an elongate core with an outer surface, the core being rotatable about an axis through the core for winding film onto the outer surface and unwinding film from the outer surface, and the core having first and second spaced surfaces defining a slot through the core for receiving an end portion of the film, the improvement comprising:
    a film keeper for retaining the film end portion in said slot, said keeper having a first portion shaped to enter said slot and hold the film end portion firmly against said first surface of said slot and a second portion engageable with the film outside said slot for holding the film against a curved portion of said outer surface of said core; and
    cooperating latch means on said core and keeper for retaining said keeper in either (1) a first position relative to said core wherein said first portion of said keeper is partially inserted into said slot but spaced from said first surface of said slot by a distance sufficient to enable the film end portion to be inserted into said slot between said first portion of said keeper and said first surface of said slot or (2) a second position wherein said first position of said keeper is fully inserted in said slot for holding the film end portion against said first surface of said slot and said second portion of said keeper holds the film against said outer surface of said core.

10. A spool as set forth in claim 9, wherein said first surface of said slot comprises a first flat portion, a step portion that slopes away from said flat portion, and a rounded portion that extends from the edge of said step portion opposite from said flat portion.

11. A spool as set forth in claim 10, further comprising a hinge connecting said first and second portions of said keeper so that said second portion of said keeper can be held away from said slot when said keeper is in said first position to facilitate insertion of the film end portion into said slot and then said second portion can be swung about said hinge as said keeper is moved from said first to said second position relative to said core.

12. A spool as set forth in claim 9, wherein said cooperating latch means comprises catches at opposite ends of said slot and two pair of recesses along side edge portions of said keeper with the first pair of recesses receiving said catches when said keeper is in said first position and the second pair of recesses receiving said catches when said keeper is in said second position.

13. A spool as set forth in claim 9 wherein said first surface of said slot has a step extending in an axial direction along said core, and said first portion of said keeper has a correspondingly shaped portion for holding the film end portion against said step.

* * * * *